United States Patent [19]

Igarashi

[11] Patent Number: 5,416,522
[45] Date of Patent: May 16, 1995

[54] MOTION DETECTION APPARATUS FOR MOVING PICTURES AND ENCODING AND DECODING APPARATUS FOR PICTURE SIGNALS

[76] Inventor: Katsuji Igarashi, c/o Sony Corporation 7-35, Kitashinagawa 6-chome, Shinagawa-ku, Tokyo, Japan

[21] Appl. No.: 33,144

[22] Filed: Mar. 16, 1993

[30] Foreign Application Priority Data

Mar. 18, 1992 [JP] Japan .................................. 4-091419

[51] Int. Cl.$^6$ ............................................. H04N 7/36
[52] U.S. Cl. ..................................... 348/416; 348/699
[58] Field of Search ............... 358/133, 136, 125, 105; 348/402, 413, 416, 699

[56] References Cited

U.S. PATENT DOCUMENTS

| | | | |
|---|---|---|---|
| 5,028,995 | 6/1991 | Izawa et al. | 358/105 |
| 5,047,850 | 9/1991 | Ishii et al. | 348/416 |
| 5,113,255 | 5/1992 | Nagarata et al. | 348/416 |
| 5,173,771 | 12/1992 | Kitazato | 348/416 |
| 5,208,667 | 5/1993 | Saunders | 358/140 |
| 5,220,508 | 6/1993 | Ninomiya et al. | 364/449 |
| 5,289,274 | 2/1994 | Kondo | 348/416 |
| 5,313,296 | 5/1994 | Ohki | 348/416 |

Primary Examiner—Tommy P. Chin
Assistant Examiner—A. Au
Attorney, Agent, or Firm—Limbach & Limbach

[57] ABSTRACT

An apparatus for detecting motion of blocks by block matching of detecting a matching degree of corresponding positions between pictures. The device comprises integrators 12 each having a calculating unit for calculating picture positions taking into account a motion vector and an angle of motion between blocks subjected to matching and an accumulator for finding and accumulating absolute values of differences for the respective picture positions, and a decision circuit 13 for collecting outputs of the integrators 12 for each of macro-blocks as a unit and finding the smallest of the integrator outputs. With the present apparatus, not only the motion vector but also the angle of motion can be detected. Therefore, if the apparatus is applied to a picture encoding and decoding system, motion compensation may be achieved effectively for pictures not only performing a translatory movement but also changing in the angle of motion.

3 Claims, 9 Drawing Sheets

| -1.5,1.5 | -0.5,1.5 | 0.5,1.5 | 1.5,1.5 |
|---|---|---|---|
| -1.5,0.5 | -0.5,0.5 | 0.5,0.5 | 1.5,0.5 |
| -1.5,-0.5 | -0.5,-0.5 | 0.5,-0.5 | 1.5,-0.5 |
| -1.5,-1.5 | -0.5,-1.5 | 0.5,-1.5 | 1.5,-1.5 |

FIG.4

MOTION DETECTION APPARATUS FOR MOVING PICTURES AND ENCODING AND DECODING APPARATUS FOR PICTURE SIGNALS

BACKGROUND OF THE INVENTION

This invention relates to a motion detection apparatus for detecting motion of a block picture by so-called block matching.

As a system for high-efficiency encoding of picture signals, for example, a high-efficiency encoding system for picture signals for a so-called digital storage medium has been prescribed in a standardization proposal by the Moving Picture Experts Group (MPEG). The storage medium considered for the system is a storage medium having a continuous transfer rate of approximately 1.5M bits/sec or less, such as a compact disc (CD) or a data audio tape (DAT). The storage medium is intended to be connected not only directly to a decoder but also via a transmission medium, such as a computer bus, local area network (LAN) or telecommunication. In addition, the storage medium is intended to perform not only forward reproduction, but also special functions, such as random access, high-speed reproduction, and reverse reproduction.

The following is the principle of the high-efficiency encoding for picture signals by MPEG.

That is, with the present high-efficiency encoding system, the difference between pictures is taken to lower redundancy along a time axis. Then, so-called discrete cosine transform (DCT) and variable length encoding are used to lower redundancy along a spatial axis.

The above-mentioned redundancy along the time axis is hereinafter explained.

In a continuous moving picture, in general, a picture at a certain moment is similar to pictures temporally preceding and succeeding it. Therefore, by taking the difference between a picture now to be encoded and the pictures temporally preceding it and then transmitting the difference, as shown for example in FIG. 1, it becomes possible to diminish redundancy along the time axis and to reduce the amount of the transmitted information. The picture encoded in this manner is termed a predictive-coded picture, P-picture or P-frame, as later explained. Similarly, by taking the difference between the picture now to be encoded and the pictures temporally preceding or succeeding it or interpolated pictures prepared from the temporally preceding and succeeding pictures, and then transmitting a smaller one of the differences, it becomes possible to diminish redundancy along the time axis to reduce the amount of the transmitted information. The picture encoded in this manner is termed a bidirectionally predictive-coded picture, B-picture or B-frame, as later explained. In FIG. 1, a picture shown by I indicates an intra-coded picture, I-picture or I-frame, while pictures P and B indicate the above-mentioned P-pictures and B-pictures, respectively.

For producing the predictive-coded pictures, so-called motion compensation is carried out.

According to the motion compensation, by producing a block of 16×16 pixels, hereinafter referred to as a macro-block, constituted for example by a plurality of unit blocks of 8×8 pixels, then searching a nearby block showing the minimum difference from the macro-block, and taking the difference between the searched block and the macro-block, the volume of transmitted data can be reduced. For example, in the above-mentioned P-picture (predictive-code picture), picture data produced by taking the difference from the motion-compensated predicted picture and picture data produced without taking the difference form the motion-compensated predicted picture are compared, and the picture data of a smaller data volume than the other, is selected for each 16×16 pixel macro-block for encoding.

However, for a portion or picture which has emerged from behind a moved object, the volume of data to be transmitted is increased. Thus, with the B-picture, one having the smallest volume of the following four kinds of picture data is encoded: picture data obtained by taking the difference between a picture now to be encoded and the decoded and motion-compensated temporally preceding picture; picture data obtained by taking the difference between the picture now to be encoded and the decoded motion-compensated temporally succeeding picture; picture data obtained by taking the difference between a picture now to be encoded and an interpolated picture obtained by summing the temporally preceding and succeeding pictures; and the picture now to be encoded.

The redundancy along the spatial axis is hereinafter explained.

The difference between picture data is not transmitted directly, but is processed by discrete cosine transform (DCT) for each of the 8×8 pixel unit blocks. The DCT expresses the picture not by the pixel level but by how much and which frequency components of the cosine function are contained in the picture. For example, two-dimensional DCT converts data of the 8×8 pixel unit block into 8×8 coefficient blocks of cosine function components. For example, image signals of a natural scene photographed with a camera tend to become smooth signals. In this case, the data volume may be efficiently diminished by DCT processing of the picture signals.

That is, if the picture signals are smooth as in the case of picture signals for a natural scene, larger coefficient values concentrate around a certain coefficient value as a result of DCT processing. If this value is quantized, most of the 8×8 pixel coefficient blocks become zero, leaving only larger coefficients. Thus, data of the 8×8 pixel coefficient blocks are transmitted in so-called zig-zag scan sequence, by employing a so-called Huffman code consisting of a non-zero coefficient and a so-called zero run indicating how many 0s preceded the coefficient, and thereby the transmitted data volume can be reduced. The picture can be reconstructed by the reverse sequence at the decoder.

FIG. 2 shows a data structure handled by the above-described encoding system. The data structure is made up, from the bottom, of a block layer, a macro-block layer, a slice layer, a picture layer, a group-of-picture (GOP) layer, and a video sequence layer, as shown in FIG. 2. These layers are explained from the bottom side in FIG. 2.

Referring first to the block layer, the blocks of the block layer are constituted by 8×8 pixels (8 lines×8 pixels) having neighboring luminances or chrominances. Each of these unit blocks is processed by discrete cosine transform (DCT).

Referring to the macro-block layer, it is made up of six blocks, namely left upper, right Upper, left lower and right lower unit luminance blocks Y0, Y1, Y2 and Y3 and unit chrominance blocks Cr, Cb which are in the same positions as those of the unit luminance blocks when viewed on the picture. These blocks are transmitted in the sequence of Y0, Y1, Y2, Y3, Cr and Cb. In the present encoding system, which picture to use as a predictive picture OF a reference picture for difference taking, or whether to transmit the difference, is decided from one macro-block to another.

The slice layer is made up of one or more macro-blocks continuously arrayed in the picture scan sequence. At a leading end (header) of the slice, a difference of a dc component and a motion vector in the picture is reset, and the first macro-block has data indicating its position in the picture. Accordingly, the position in the image may be restored on error occurrence. Therefore, the length and the starting position of the slice are arbitrarily set and may be changed depending on the state of errors produced in the transmission path.

In the picture layer, each picture is made up of one or more of the slices. The pictures are classified into the above-mentioned four types of pictures, that is, the intra-coded picture (I-picture or I-frame), the predictive-coded picture (P-picture or P-frame), the bidirectionally predictive-coded picture (B-picture or B-frame), and DC coded picture, each in accordance with the encoding system.

In the intra-coded picture (I-picture), only the information closed in that particular picture is employed at the time of encoding. In other words, the picture can be reconstructed solely by the information within that I-picture at the time of decoding. In effect, encoding is carried out by direct DCT processing without taking the difference. Although the encoding system generally has a poor efficiency, random access or high-speed reproduction may be realized by inserting the I-picture into various places in the MPEG encoding system.

In the predictively-coded picture (P-picture), the I-picture or the P-picture, which are in temporally preceding positions at the input and are already decoded, are used as the reference picture. In effect, the one higher in efficiency, of encoded data obtained after taking the difference from the motion-compensated reference picture and encoded data without taking the difference (intra-code), is selected from one macro-block to another.

In the bidirectional predictive-coded picture (B-picture), three types of pictures are used, that is, the I-picture or P-picture both of which precede temporally and have already been decoded, and interpolated pictures produced from the I-picture and the P-picture. In this manner, the most efficient one of the encoded data of the difference after the motion compensation and the intra-coded data may be selected from one macro-block to another.

The above-mentioned DC coded I-picture is an intra-coded picture constituted solely by DC coefficients of DCT, and cannot exist in the same sequence as the remaining three picture types.

The group-of-picture (GOP) layer is made up of one or more I-pictures and zero or plural non-I-pictures. If the input sequence to the encoder is, for example, 1I, 2B, 3B, 4P*5B, 6B, 7I, 8B, 9B, 10I, 11B, 12B, 13P, 14B, 15B, 16P*17B, 18B, 19I, 20B, 21B and 22P, an output sequence of the encoder, that is, the input sequence to the decoder is 1I, 4P, 2B, 3B*7I, 5B, 6B, 10I, 8B, 9B, 13P, 11B, 12B, 16P, 14B, 15B,19I, 17B, 18B, 22P, 20B and 21B. The reason such an exchange of sequence is carried out in the encoder is that, for encoding or decoding the B-picture, for example, the I-picture or the P-picture, which is the reference picture therefor, has to be encoded in advance of the B-picture. The interval for the Z-picture, such as 9, or the interval for the I-picture or the B-picture, such as 3, is arbitrarily set. Besides, the Z-picture or P-picture interval may be changed within the GOP layer. The junction point of the GOP layer is indicated by *, while the I-picture, P-picture and the B-picture are indicated by Z, P and B, respectively.

The video sequence layer is made up of one or more of the GOP layers having the same picture size and the same picture rate.

With the moving picture encoding system standardized by MPEG, the information of a picture compressed in itself is first transmitted, and then the difference between the picture and a motion-compensated picture therefor is transmitted.

In addition, in the conventional motion compensation, a motion vector is transmitted for each macro-block and, at the picture decoder, the already decoded picture is translated for motion compensation based on the motion vector, thereby reducing the difference from the picture and hence the volume of the transmitted information for enabling efficient picture transmission.

However, in case of producing a picture for movement of a man raising his arm, in which not only the position but also the angle of the arm is changed, the above-mentioned motion compensation cannot provide an appropriate predictive picture, thereby increasing the volume of the difference and deteriorating the picture quality.

SUMMARY OF THE INVENTION

In view of the above-described status of the art, it is an object of the present invention to provide a motion detection apparatus for a moving picture which may be applied to an encoding and decoding apparatus for moving pictures, and whereby effective motion compensation may be carried out for a picture which not only is translated but is changed in the angle of motion in the moving picture encoding and decoding apparatus, thus raising decoding efficiency.

According to the present invention, there is provided a motion detection apparatus for detecting a motion of blocks each of which being a two-dimensional array of pixels smaller in size than one picture of input picture signals, by block matching of detecting a matching degree of corresponding positions between temporally different picture signals, the motion detection apparatus comprising calculating circuits for calculating the positions corresponding to a motion vector and an angle of motion between the blocks carrying out block matching, subtractors for finding and accumulating sums of absolute values of differences for each of the positions by the calculating circuit, and decision circuits for collecting outputs of the subtractor on a block-by-block basis to decide the smallest of the outputs.

According to the present invention, there is also provided a motion detection apparatus for detecting a motion of blocks each of which being a two-dimensional array of pixels smaller in size than one picture of input picture signals, by block matching of detecting a matching degree of corresponding positions, the motion detection apparatus comprising integrators for detecting the motion vector and the angle of motion from block to block and integrating sums of the absolute values of the differences for the motion vector and the angle of motion.

That is, if the motion detection apparatus for moving pictures of the present invention is applied to a moving picture encoding apparatus, motion compensation is carried out with rotation based on information concerning the motion vector and the angle of motion from block to block, in the moving picture encoding apparatus. A predicted picture is formed by such motion compensation, and a difference between the predicted picture and an input picture is encoded for efficiently encoding the moving picture.

BRIEF DESCRIPTION OF THE DRAWINGS

FIG. 4 shows (X, Y) positions in a macro-block of the apparatus shown in FIG. 3.

DESCRIPTION OF THE PREFERRED EMBODIMENTS

Figure 1:
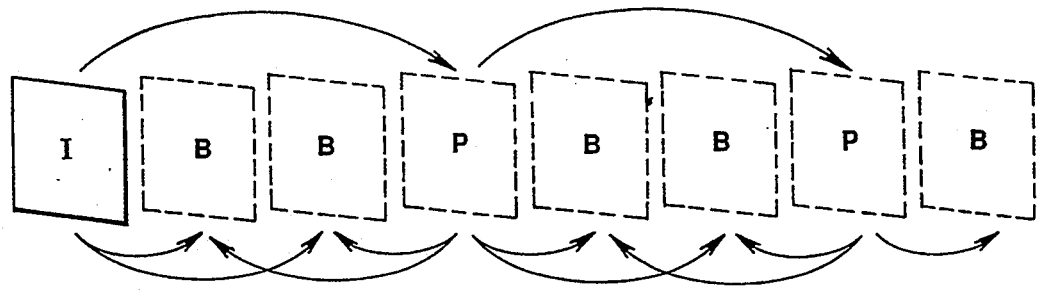
FIG. 1 is a diagrammatic view for illustrating predictive-coded pictures.
Figure 2:
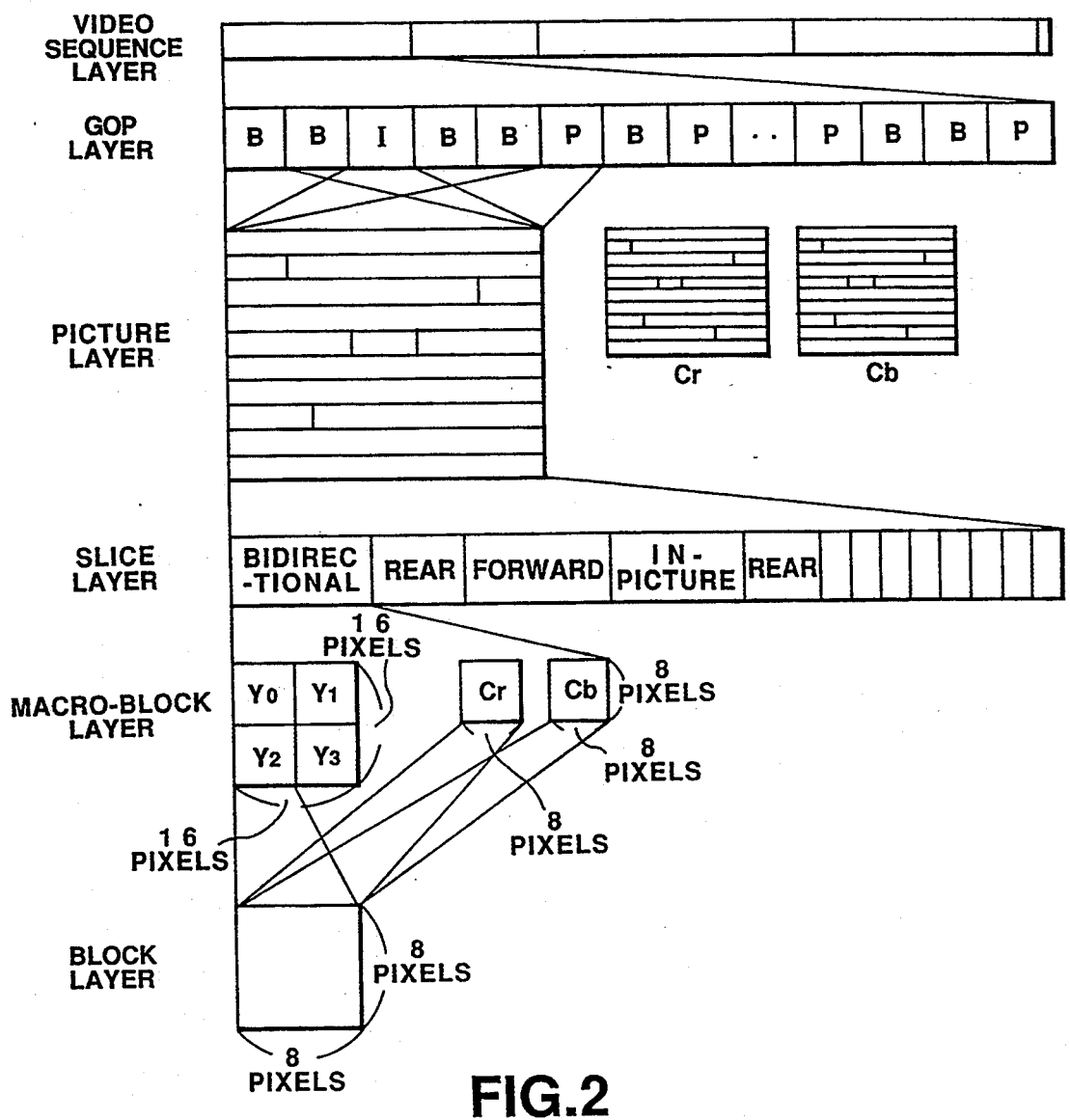
FIG. 2 is a diagrammatic view showing a data structure as proposed by MPEG.

Preferred embodiments of the present invention will be explained by referring to the drawings.

A motion detection apparatus for moving pictures of the present invention detects a motion of blocks of pixels by block matching of detecting a matching degree of corresponding positions of temporally different picture signals (pictures), each of the blocks being a macro-block, that is, a two-dimensional array of pixels having a size smaller than one picture of input picture signals. The apparatus comprises integrators 12 having calculating means for calculating positions corresponding to a motion vector and an angle of motion between the blocks subjected to block matching and accumulating means for accumulating sums of absolute values of differences for each of the positions calculated by the calculating means, and a decision circuit 13 as decision means for collecting outputs of the integrators 12 for each of the macro-blocks as a unit and selecting the smallest of these outputs, as shown in FIG. 3.

Figure 3:
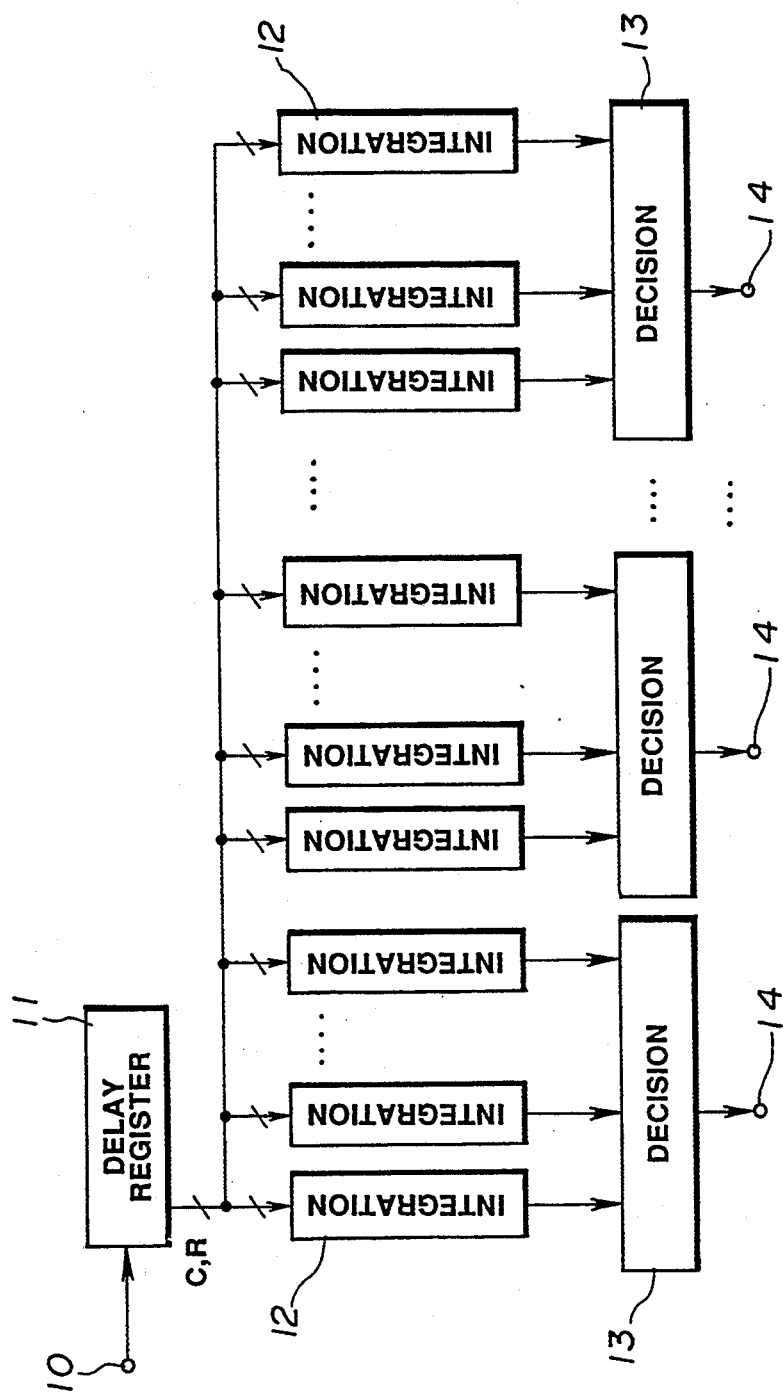
FIG. 3 is a block circuit diagram showing a schematic arrangement of an overall motion detection apparatus for a moving picture according to the present invention.

In FIG. 3, the input picture signals are supplied via an input terminal 10 to a delay register 11.

In the present embodiment, if a search range for block matching is set for $\pm K$ pixels, with the macro-block being, for example, $L \times L$ pixels in size, the number of taps needed for the delay register 11 is $C(-M, -M) \sim C(M, M)$, where $M = (K \times 2^{1/2}/2) \times (L-1)$.

In the present embodiment, the macro-block is $4 \times 4$ pixels in size and the search range is $\pm 3$ pixels in a horizontal direction and $\pm 3$ pixels in a vertical direction, with respect to the macro-block. Accordingly, the search range is $\pm 5$ pixels and the number of taps of the delay register 11 is $C(-5, -5) \sim C(5, 5)$. Meanwhile, positions (X, Y) within the $4 \times 4$ pixel macro-block is as shown in FIG. 4.

Also, in the present embodiment, the above-mentioned block matching is carried out in an inter-frame picture.

Figure 5:
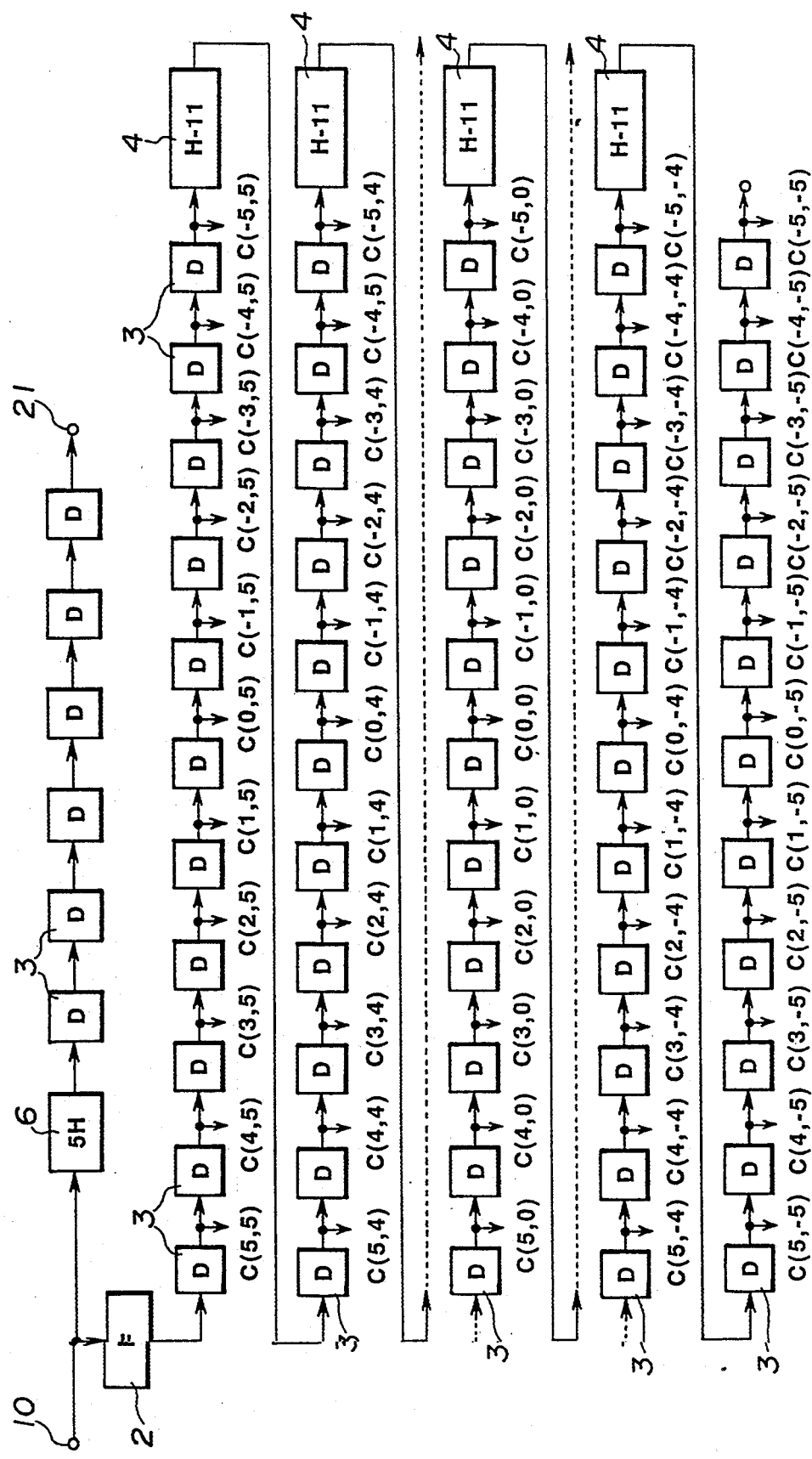
FIG. 5 is a block circuit diagram showing a concrete constitution of a delay register of the motion detection apparatus shown in FIG. 3.

The delay register 11 is constructed, specifically, as shown in FIG. 5. That is, the delay register 11 shown in FIG. 5 is made up of a frame memory 2 for delaying input data by one frame, a delay circuit 6 for delaying the input data by five horizontal scanning lines (5H), a delay circuit 4 for carrying out a delay equal to the number of pixels less than that for one horizontal line by 11 pixels (H−11), and a one-pixel delay circuit (register) 3. Meanwhile, a combination of eleven registers 3 and the delay circuit 4 provides a delay for one horizontal line.

In FIG. 5, the input picture signals (picture data) from the input terminal 10 are transmitted to a delay circuit 6 for the five horizontal scanning lines (5H) and to the frame memory 2. The arrangement downstream of the delay circuit 6 provides a delay of M lines+(M+1) pixels, that is, a delay of 5 lines+6 pixels. Specifically, signals from the 5H delay circuit 6 are passed through the six one-pixel registers 3 and are then taken out at a terminal 21. Data R taken out from the terminal 21 are pixel data for the current picture, that is, data in the center position of the search range for the time of block matching.

In other words, when the center of the search range of the current picture is in a position delayed by 5 lines×6 pixels from the input picture data, all the macro-blocks included within the search range centering around the same position as in a picture preceding the current picture by one frame become subjected to comparison in block matching.

On the other hand, the data passed through the frame memory 2 is data delayed by one frame from the data inputted to the delay circuit 6. Since the downstream side of the frame memory 2 is made up of 11 stages of the registers 3 directly connected with the (H−11) delay circuit, 4, as shown in FIG. 5, the data of the tap C(0, 0), delayed by 5 lines and 6 pixels from data directly after passage through the frame memory 2, has a time difference of one frame from the data R produced at the terminal 21.

Referring to FIG. 5, since a data string processed by horizontal scanning like ordinary picture signals is supplied to the input terminal 10, picture data of a preceding picture is obtained at each tap for the data R of the current picture. That is, when a picture is inputted, a delay difference of one picture+j lines+one pixel is generated between the data R and data of C(i, j). For example, data of C(0, 0), that is, data preceding the data R by one pixel in the horizontal direction, is produced at, C (1, 0).

For finding the moving vector, absolute values of the difference between the data C(i, j) and the data R of each tap of FIG. 5 are taken, and the absolute values of the differences for the macro-blocks are collected and summed together, thereby finding the minimum value.

On the other hand, for finding the angle of motion, absolute values of the differences between the data C (i, j) of a tap corresponding to the position (i, j) as found by the formulas below and the data R are taken, and the absolute values of the differences for the macro-blocks are collected and summed together, thereby finding its minimum value.

$$i = V_x + X \cos\theta - Y \sin\theta \quad (1)$$

$$j = V_y + X \sin\theta + Y \cos\theta \quad (2)$$

$\theta$ in the formulas (1) and (2) is the angle of motion. For instance, if the search range is set to $+90° \sim -90°$, $\theta$ takes a value of every 5°.

$(V_x, V_y)$ is the motion vector.

(X, Y) is relative positional coordinates of a pixel in the macro-block. For instance, if the macro-block is set to be a 5×5 pixel block with its center coordinates being (0, 0), (X, Y) takes 25 values from (−2, −2) to (2, 2).

The motion $(V_x, V_y, \theta)$ corresponding to the minimum sum value after the end of the summing together of the absolute values for the macro-blocks is a solution for the motion vector and the angle of motion, or a solution vector.

Figure 6:
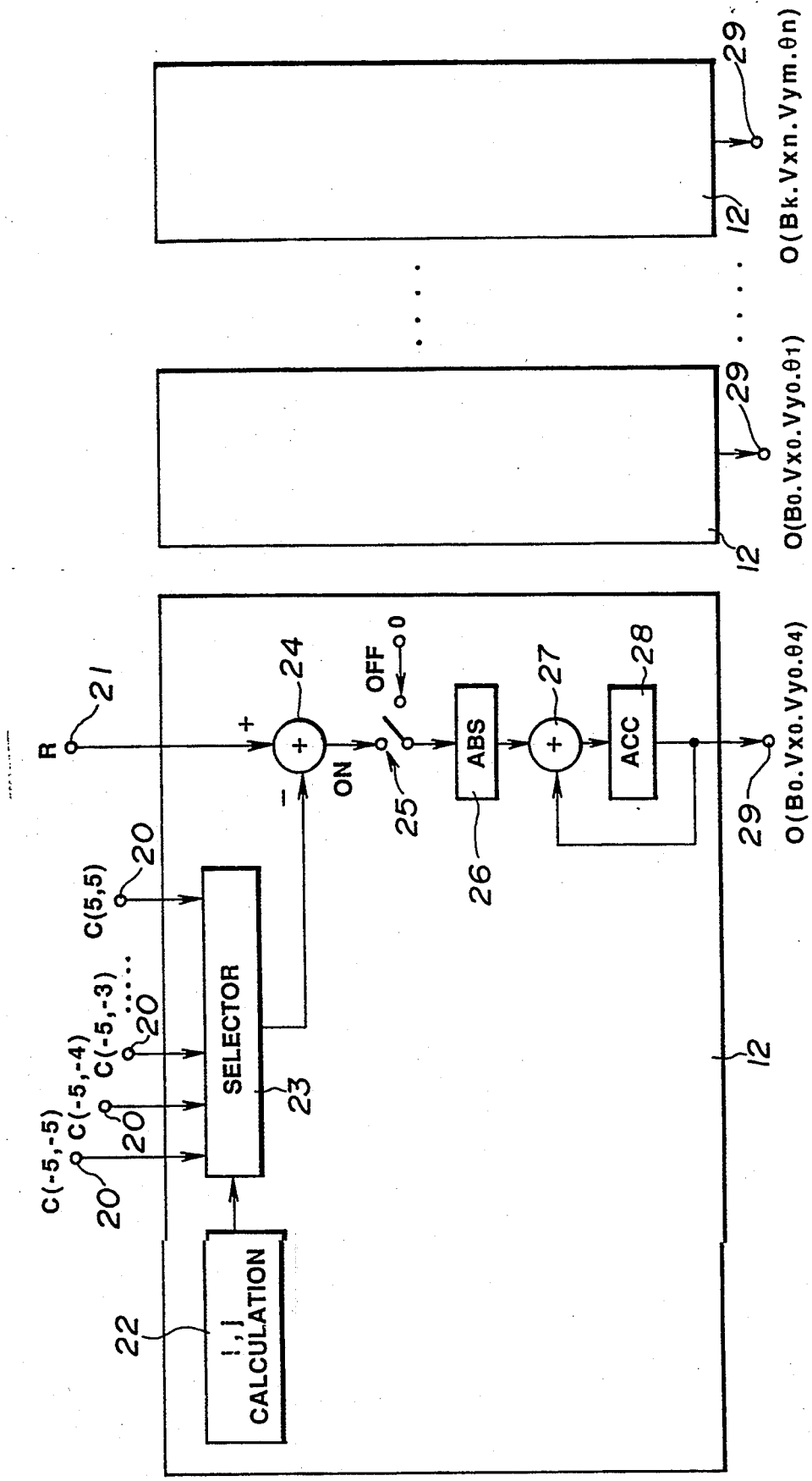
FIG. 6 is a block circuit diagram showing a concrete constitution of an integrator of the motion detection apparatus shown in FIG. 3.
Figure 7:
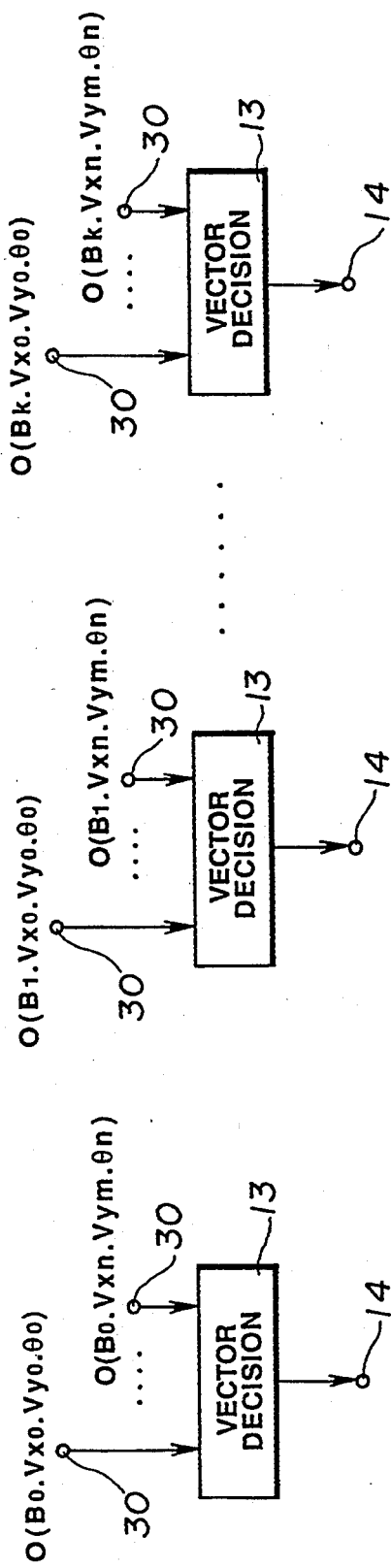
FIG. 7 is a block circuit diagram showing decision circuits of the motion detection apparatus shown in FIG. 3 and input data thereto.

To this end, each of the integrators 12 and the decision circuit 13, provided on the latter stage of the delay register 11 of FIG. 3, are constituted as shown in FIGS. 6 and 7, respectively.

In the present embodiment, if the number of the macro-blocks is set to k, the number of X-components $V_x$ of the motion vector to h, the number of Y-components $V_y$ of the motion vector to m, and the number of samples of angles of motion $\theta$ to n, the number of the integrators 12 shown in FIGS. 6 and 3 to be prepared is equal to k×h×m×n. The number of the decision circuits 13 to be prepared is equal to k, corresponding to the number of the macro-blocks.

Referring to FIG. 6, each integrator 12 of the present embodiment is made up of a calculating circuit 22 as calculating means for calculating the corresponding positions taking into account the moving vectors and the angles of motion between macro-blocks to be subjected to block matching, a subtractor 24 as accumulating means for finding and accumulating the integrated value of the absolute values of the differences for the positions obtained by the calculating circuit 22, and an accumulator made up of a changeover switch 25, an absolute value (ABS) circuit 26, an adder 27 and a register or memory 28.

That is, in FIG. 6, data C(−5, −5), C(−5, −4), C(−5, −3), . . . C(5, 5) from the taps shown in FIG. 5 are supplied to the respective terminals 20 of the integrators 12, and the data R is supplied to the terminal 21. The data supplied to the terminals 20 are transmitted to a selector 23.

The calculating circuit 22 calculates the positions (i, j) of pixels within the search range taking into account the motion vector and the angle of motion, and outputs a selection control signal for selecting one of data C(i, j) corresponding to the positions (i, j) as found by the calculation. The selection control signal is supplied to the selector 23. The positions (i, j) may be calculated for all or a sub-sampled fraction of the pixels.

The data R passed through the terminal 21 and the data C(i, j) as selected by the selector 23 are transmitted to the subtractor 24 for producing differential data. The differential data are supplied via the changeover switch 25 to the absolute value circuit 26. Only the changeover switch 25 of the integrator 25 corresponding to the macro-block to which data R belongs is turned ON, while the changeover switches of the other integrators are turned OFF.

The absolute values of the difference data, taken at the absolute value circuit 26, are accumulated by the accumulator made up of the adder 27 and the register 28.

The cumulative values found at the integrators 12 are outputted via output terminals 29 as accumulation outputs $O(B_0, V_{x0}, V_{y0}, \theta_0)$, $O(B_0, V_{x0}, V_{y0}, \theta_1)$, ... $O(B_k, V_{xh}, V_{ym}, \theta_n)$. The cumulative outputs from the terminals 29 are transmitted to terminals 30 of the vector decision circuits 13 shown in FIGS. 7 and 3.

The decision circuits 13 of FIG. 7 are supplied with the cumulative outputs for each of the macro-blocks as units to decide the smallest of these outputs. Thus, the information concerning the motion vectors and the angles of motion for the macro-blocks, that is, the solution vectors, is obtained at the decision circuits 13. The data of these solution vectors are transmitted from the terminals 14 to prediction units of, for example, an encoding apparatus, on a latter stage which will be explained subsequently.

Figure 8:
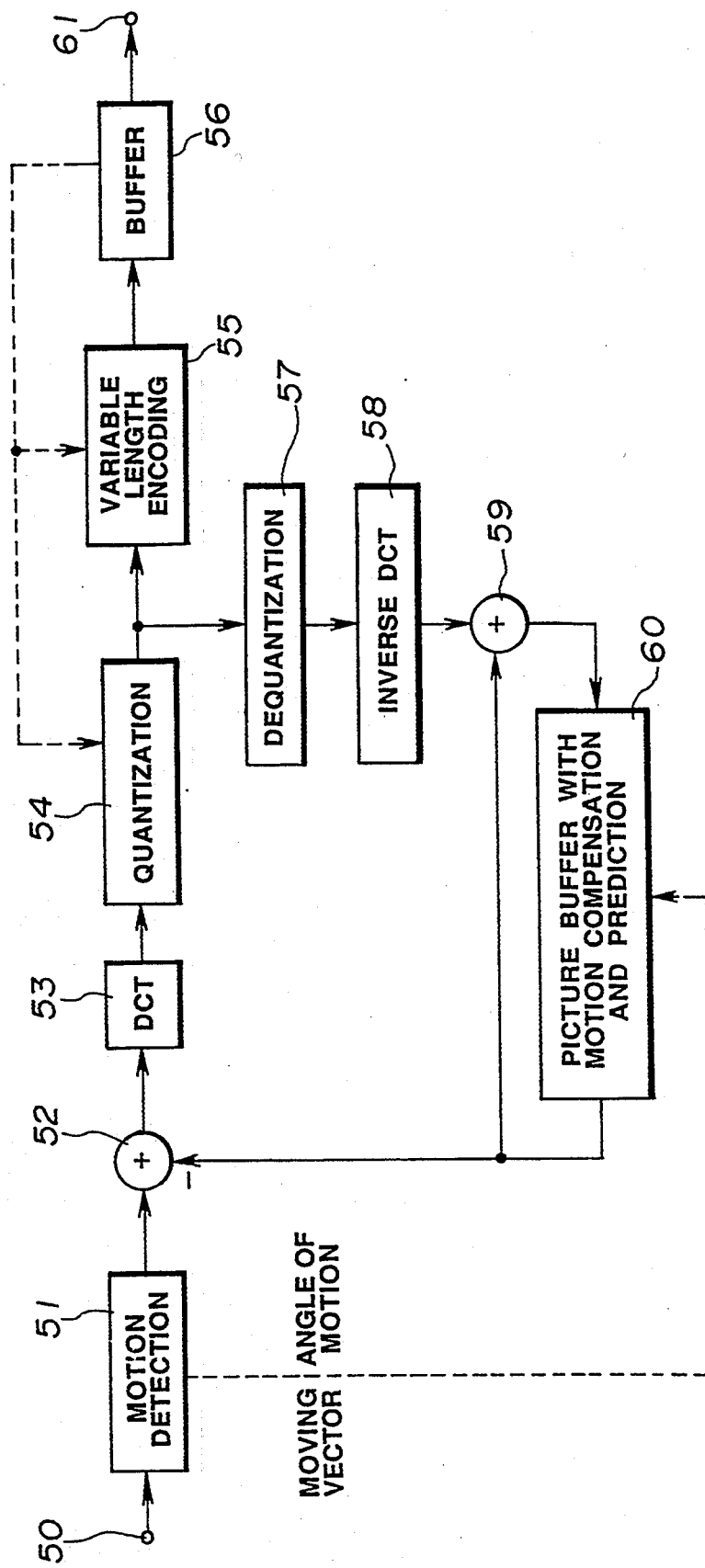
FIG. 8 is a block circuit diagram showing a schematic arrangement of an encoding system for moving pictures to which the motion detection apparatus shown in FIG. 3 is applied.

FIG. 8 shows a schematic arrangement of a moving picture encoding apparatus to which the motion detection apparatus for moving pictures according to the present invention is applied. The encoding apparatus encodes the moving picture in three ways, that is, for producing the intra-coded picture or I-picture, the predictive-coded picture or P-picture, and the bidirectional predictive-coded picture or B-picture, as described before.

That is, with the I-picture, intra-encoding is carried out for all the macro-blocks. Specifically, an input picture is processed for each of the macro-blocks by DCT, and the produced DCT coefficients are quantized and encoded by variable length encoding.

With the P-picture, by using the temporally preceding I-picture or P-picture as a reference, motion compensation is carried out on the basis of data of the motion vector and the angle of motion as detected by a motion detection unit 51 of FIG. 8 consisting of the above-described motion detection apparatus. The difference from the motion-compensated picture is DCT processed, quantized and encoded by variable length encoding.

If it is decided that there are numerous difference data and therefore that the intra-encoding is preferred, the encoding may be switched to intra-coding from one macro-block to another.

With the B-picture, the difference from the picture motion-compensated from the temporally preceding I-picture or P-picture, the difference from the picture motion-compensated from the temporarily succeeding I-picture or P-picture, and the difference from the picture most similar to an average picture of these two pictures are encoded in a similar manner.

In this case, similarly to the above-mentioned case for the P-picture, the encoding may be switched to intra-coding from one macro-block to another.

In the arrangement of FIG. 8, digital picture signals are supplied to an input terminal 50, and macro-block data are supplied by way of the above-described motion detection unit 51 to a difference detection unit 52. Motion-compensated predictive-coded picture data from a prediction unit 60 of a motion-compensating picture buffer operated on the basis of data of the motion vector and the angle of motion from the motion detection unit 51 are also supplied to the difference detection unit 52, for detecting the difference between the data.

An output from the difference detection unit 52, or a predictive difference signal, is transmitted to a DCT circuit 53 for orthogonal transform (DCT) processing. DCT coefficient data from the DCT circuit 53 is transmitted to a quantizer 54. Quantized data from the quantizer 54 is outputted as encoded data at an output terminal 61 via a variable length encoding circuit 55 for processing the data with variable length encoding, such as Huffman encoding or run-length encoding, and via a buffer 56.

The quantized data from the quantizer 54 is supplied to the prediction unit 20 via a dequantizer 57 for dequantizing the data, an inverse DCT circuit 58 as means for carrying out inverse orthogonal transform, and an adder 59. The adder 59 adds an output of the inverse DCT circuit 58 to an output of the prediction unit 20. A signal for preventing an overflow of the buffer 56 is fed back from the buffer 56 to the quantizer 54.

Figure 9:
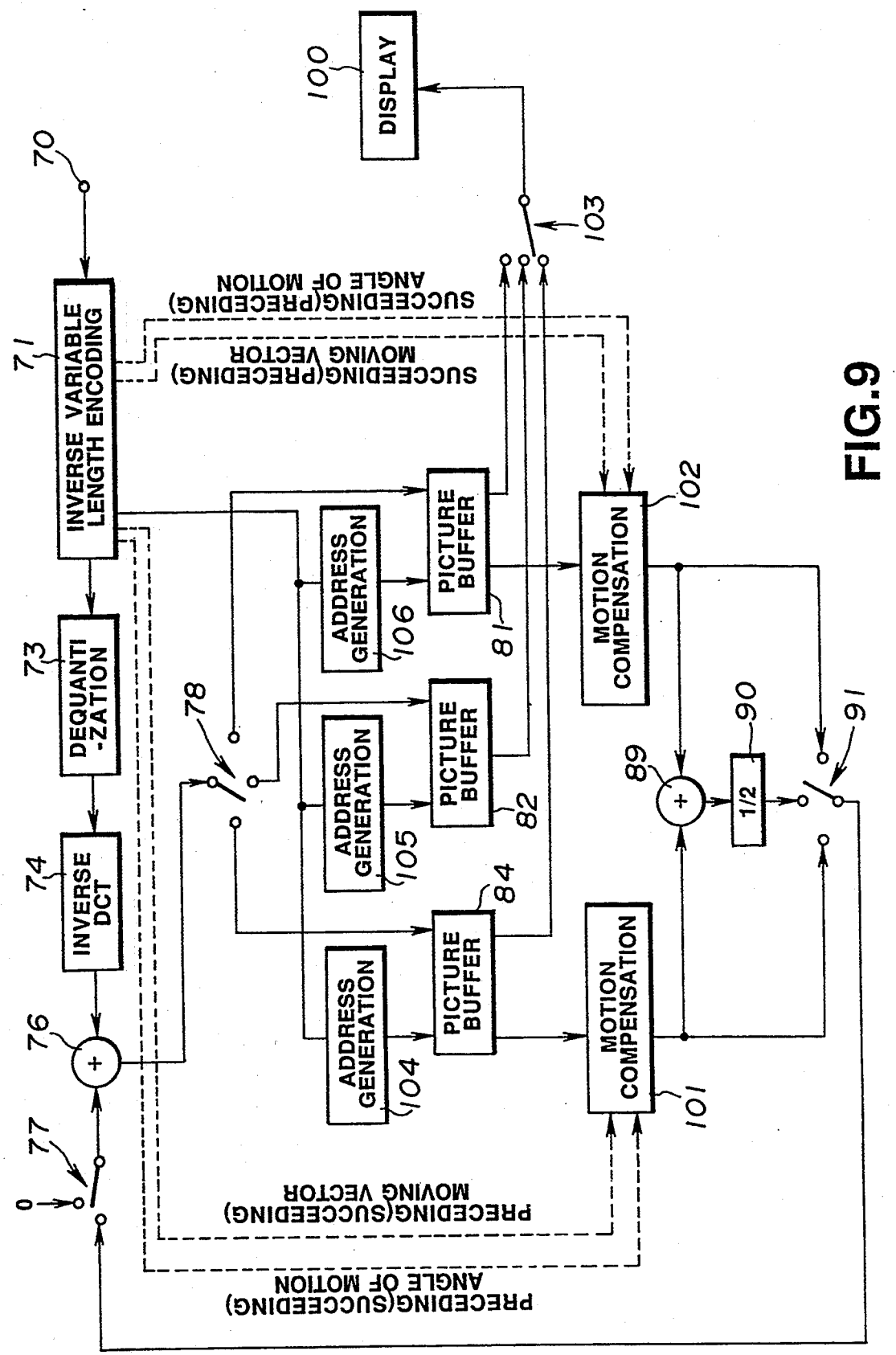
FIG. 9 is a block circuit diagram showing a schematic arrangement of a decoding system associated with the encoding system shown in FIG. 8.

FIG. 9 shows a decoding apparatus for decoding a bit stream of the data encoded in the above-described manner.

Referring to FIG. 9, encoded data from the encoding apparatus is recorded on a storage medium, such as a CD. The encoded data reproduced from the CD is supplied to a terminal 70 and then to an inverse variable length encoding circuit 71, where the header data is decoded for each sequence, picture group, and slice (macro-block group).

Quantization width data is included in the slice header. Macro-block type data indicating the decoding system is decoded for each macro-block, and necessary data for this decoding system, selected from the quantization width data in case of updating, data of preceding moving vector and preceding angle of motion, and data of succeeding moving vector and succeeding angle of motion, is decoded.

Of these parameters, picture data is transmitted to a dequantizer 73, while data of the preceding moving vector and angle of motion and data of the succeeding moving vector and angle of motion are transmitted to motion compensators 101, 102. The picture data from the dequantizer 73 is decoded by an inverse DCT circuit 74 and is then transmitted to an adder 76. It is then decided, depending on the macro-block type, whether the encoding mode is the intra-coding mode or the intercoding mode. A mode switch 77 is changed over, depending on the decision result. By changeover of the mode switch 77, it is decided whether or not to add an output from the inverse DCT circuit 74 to the reference picture. The picture decoded in this manner is inputted to a picture buffer 84 or 81 when the picture is an I-picture or a P-picture, and to a picture buffer 82 when the picture is a B-picture. In the former case, the pictures are transmitted alternately to the picture buffers 84 and 81. Meanwhile, writing in the picture buffers is controlled by changing over of a switch 78.

When decoding the P-picture, motion compensation is carried out, by using the picture within the picture buffer 81 as a reference picture in case the decoded picture is to be inputted to the picture buffer 84, and by using the picture within the picture buffer 84 as a reference picture in case the decoded picture is to be inputted into the picture buffer 81. If the information concerning the moving vector and the angle of motion is supplied to the motion compensators 101, 102, such information is used for taking out motion-compensated pictures from the reference pictures for each macro-block.

Memory addresses for reading are calculated on the pixel-by-pixel basis, depending on the moving vector, the angle of motion and the position within the macro-block.

With the moving vector being ($V_x$, $V_y$), the angle of motion $\theta$, and the position within the macro-block (X, Y), the addresses are provided as pixel addresses of a reference frame in a position diverted from pixels of the current frame by:

$$i = V_x + X \cos\theta - Y \sin\theta$$

in the horizontal direction, and $$j = V_y + X \sin\theta - Y \cos\theta$$

in the vertical direction. Addresses to be written in the picture buffers 81, 82 and 84 are provided by address generators 104, 105 and 106, respectively. These address generators 104, 105 and 106 calculate address increment values from macro-block address increments in the macro-block header data, so as to find the leading address of each macro-block.

When decoding the B-picture, motion-compensated pictures are generated for each of the picture buffers 84 and 81, as in the case of decoding the P-pictures. The motion-compensated pictures are supplied via a switch 91, which is changed over in accordance with the mac to-block type, and are then added to the decoded difference picture by the adder 76.

Meanwhile, the switch 91 is supplied with signals produced by outputs of the motion compensators 101, 102, added together by the adder 89 and then halved by a divider 90, and outputs of the motion compensators 101, 102. An output of the switch 91 is supplied to the switch 77.

Figure 10:
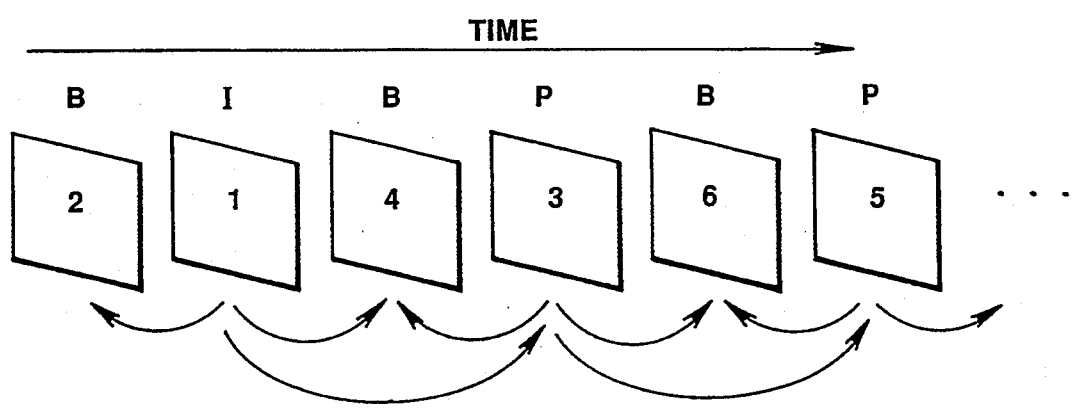
FIG. 10 is a diagrammatic view showing the encoding sequence and the sequence of reproduced pictures after decoding according to the present invention.

Outputs of the picture buffers 81, 82 and 84 are supplied via a switch 103 to a picture display 100. The outputs of the picture buffers are changed over by the switch 103 and are supplied to the display 100 so that the pictures are displayed in the sequence of reproduction, as shown in FIG. 10, instead of in the sequence of decoding.

In the motion detection apparatus of the present invention, since the moving vector and the angle of motion are detected for each macro-block, it becomes possible to encode the moving picture efficiently by encoding using the information concerning the detected moving vector and angle of motion. Thus, the picture may be reproduced with a smaller information volume at the decoder. The reduction in the information volume allows an increased volume of information to be allocated to other sections, thereby realizing high-quality picture reproduction.

What is claimed is:

1. An encoding apparatus for picture signals for dividing input picture signals into blocks consisting of plural pixels, processing picture signals of each of the blocks or predictive difference signals by orthogonal transform, and quantizing and transmitting a transform coefficient of a block, said encoding apparatus comprising:

a motion detection unit for moving pictures for detecting motion of blocks, each block being a two-dimensional array of pixels, by block matching of detecting a matching degree of corresponding positions of temporally different picture signals, wherein said motion detection unit comprises calculating means for calculating positions corresponding to a motion vector and an angle of motion between the blocks subjected to said block matching, wherein a position of a pixel in a second block subject to said block matching is defined by (i, j), the motion vector has an X component $V_x$ and a Y component $V_y$, a position of a pixel in a first block subject to said block matching is defined by (X, Y), the components of the motion vector representing a translational motion between the first and second blocks is found from the absolute value of the difference between the location (X, Y) and the location (i, j), and further, wherein the angle of motion $\theta$ representing a rotational motion between the first and second blocks is found according to the following equations:

$$i = V_x + X \cos \theta - Y \sin \theta,$$

and $$j = V_y + X \sin \theta + Y \cos \theta;$$

accumulating means for accumulating absolute values of differences for each of the positions obtained by said calculating means; and decision means for deciding a minimum value of outputs of said accumulating means on a block-by-block basis; and a motion compensator for motion compensation based on said motion vector and said angle of motion obtained by said motion detection unit.

2. A decoding apparatus for picture signals for decoding a bit stream of transmitted encoded data, the encoded data including picture data and reference frame data, the apparatus comprising:

a dequantizer for dequantizing the picture data included in the encoded data;

means for carrying out an inverse orthogonal transform of said dequantized data;

a memory for storing data concerning the reference frame; and motion compensator means for calculating addresses of said memory read out from said reference frame on a pixel-by-pixel basis, wherein the compensator means calculates the addresses from a motion vector, an angle of motion, and a pixel position in a block, the position of a pixel in the block being defined by (i, i), the motion vector having an X component $V_x$ and a Y component $V_y$, a position of a pixel in the reference frame being defined by (X, Y) and the components of the motion vector representing a translational motion between the block and the reference frame and being found from the absolute value of the difference between the location (X, Y) and the location (i, j), the angle of motion $\theta$ representing a rotational motion between the reference frame and the block and being found according to the following equations:

$$i = V_x + X \cos \theta - Y \sin \theta,$$

and $$j = V_y + X \sin \theta + Y \cos \theta,$$

when motion-compensating on the basis of the motion vector and the angle of motion and finding a predictive picture in said encoded data.

3. A method of analyzing a sequence of pictures which are transmitted from a first location to a second location and detecting motion of an image or images contained in the sequence of pictures, in order to reduce an amount of transmitted data needed to reproduce the sequence of pictures, the method comprising:

selecting a first picture in a sequence of pictures;

dividing a second picture in the sequence of pictures into a plurality of smaller image units;

comparing a first smaller image unit of the first picture to a corresponding second smaller image unit of the second picture to determine a difference between the first and second smaller image units;

determining a motion vector and an angle of motion which represent the difference between the first and second smaller image units, wherein a position of a pixel in the second smaller image unit of the second picture is defined by (i, j), the motion vector has an X component $V_x$ and a Y component $V_y$, a position of a pixel in the first smaller image unit is defined by (X, Y) and further, wherein the components of the motion vector representing a translational motion between the first and second smaller image units is found from the absolute value of the difference between the location (X, Y) and the location (i, j), and the angle of motion representing a rotational motion between the first and second smaller image units and is found according to the following equations:

$$i = V_x + X \cos \theta - Y \sin \theta,$$

and $$j = V_y + X \sin \theta + Y \cos \theta;$$

encoding the first picture and the motion vector and angle of motion;

transmitting the encoded data to the second location; and decoding the transmitted data and using the first picture and the motion vector and angle of motion representing a difference between the first smaller image unit of the first picture and the second smaller image unit of the second picture to reconstruct the second picture.

* * * * *

UNITED STATES PATENT AND TRADEMARK OFFICE
CERTIFICATE OF CORRECTION

PATENT NO. : 5,416,522
DATED : May 16, 1995
INVENTOR(S) : Katsuji Igarashi

It is certified that error appears in the above-indentified patent and that said Letters Patent is hereby corrected as shown below:

On the title page, insert the following:

[73]  Assignee:  Sony Corporation
                            Tokyo, Japan

Signed and Sealed this

Fourteenth Day of May, 1996

*Attest:*

BRUCE LEHMAN

*Attesting Officer*    *Commissioner of Patents and Trademarks*